(12) United States Patent
Wagle et al.

(10) Patent No.: US 11,492,537 B2
(45) Date of Patent: Nov. 8, 2022

(54) NANOSIZED DENDRIMERIC EPOXY RESIN AS A LOSS CIRCULATION MATERIAL

(71) Applicant: SAUDI ARABIAN OIL COMPANY, Dhahran (SA)

(72) Inventors: Vikrant Wagle, Dhahran (SA); Jothibasu Ramasamy, Dhahran (SA); Abdullah AlYami, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/224,629

(22) Filed: Apr. 7, 2021

(65) Prior Publication Data
US 2022/0325165 A1 Oct. 13, 2022

(51) Int. Cl.
| | | |
|---|---|---|
| *E21B 33/138* | (2006.01) | |
| *C09K 8/508* | (2006.01) | |
| *C08G 77/48* | (2006.01) | |
| *E21B 21/00* | (2006.01) | |
| *C09K 8/035* | (2006.01) | |
| *C08G 77/50* | (2006.01) | |

(52) U.S. Cl.
CPC .......... *C09K 8/5086* (2013.01); *C08G 77/485* (2013.01); *C08G 77/50* (2013.01); *C09K 8/035* (2013.01); *E21B 21/003* (2013.01); *E21B 33/138* (2013.01)

(58) Field of Classification Search
CPC .......... C08G 77/14; E21B 33/138; C09K 8/50
See application file for complete search history.

(56) References Cited

U.S. PATENT DOCUMENTS

| | | | |
|---|---|---|---|
| 4,072,194 | A | 2/1978 | Cole et al. |
| 5,875,845 | A | 3/1999 | Chatterji et al. |
| 6,802,375 | B2 | 10/2004 | Bosnia et al. |
| 8,235,116 | B1 | 8/2012 | Burts, Jr. et al. |
| 9,550,933 | B2 | 1/2017 | Chatterji et al. |
| 9,784,079 | B2 | 10/2017 | Salla et al. |
| 10,280,122 | B2 | 5/2019 | Salla et al. |
| 10,287,480 | B1 | 5/2019 | Reddy |
| 10,344,200 | B2 | 7/2019 | Salla et al. |
| 10,450,495 | B2 | 10/2019 | Reddy |
| 10,526,524 | B2 | 1/2020 | Reddy |
| 2010/0181729 | A1 | 7/2010 | Slay et al. |
| 2013/0175026 | A1 | 7/2013 | Chakraborty et al. |
| 2014/0083702 | A1 | 3/2014 | Godfrey et al. |
| 2015/0011440 | A1 | 1/2015 | Zamora et al. |
| 2015/0218432 | A1 | 8/2015 | Quintero et al. |
| 2016/0208157 | A1 | 7/2016 | Vo et al. |
| 2016/0264842 | A1 | 9/2016 | Miller et al. |
| 2016/0312105 | A1 | 10/2016 | Vo et al. |
| 2017/0198192 | A1 | 7/2017 | Panamarathupalayam et al. |
| 2018/0030332 | A1 | 2/2018 | Chakraborty et al. |
| 2019/0040296 | A1 | 2/2019 | Panamarathupalayam et al. |
| 2019/0211253 | A1 | 7/2019 | Fu et al. |
| 2019/0225875 | A1 | 7/2019 | Singh et al. |
| 2021/0189218 | A1 | 6/2021 | Al-Yami et al. |
| 2021/0189219 | A1 | 6/2021 | Alanqari et al. |
| 2021/0261849 | A1 | 8/2021 | Alshaikh et al. |

FOREIGN PATENT DOCUMENTS

| | | |
|---|---|---|
| EP | 0899415 A1 | 3/1999 |
| EP | 2167604 A4 | 12/2010 |
| KR | 1020190133564 | * 12/2019 |

OTHER PUBLICATIONS

KR 10 2019 0133564 machine translation (2019).*
International Search Report Issued in Corresponding Application No. PCT/US2022/023785, dated Jul. 8, 2022, 4 pages.
Written Opinion Issued in Corresponding Application No. PCT/US2022/023785, dated Jul. 8, 2022, 6 pages.

* cited by examiner

*Primary Examiner* — Kuo Liang Peng
(74) *Attorney, Agent, or Firm* — Osha Bergman Watanabe & Burton LLP

(57) ABSTRACT

An epoxy resin system composition and a loss circulation material including the reaction product of the epoxy resin system are provided. The epoxy resin system includes a polyhedral oligomeric silsesquioxane (POSS) epoxy resin with at least one reactive group, a curing agent, and a $CO_2$ gas-generating compound. The $CO_2$ gas-generating compound generates $CO_2$ during the reaction such that a volume of the lost circulation material is greater than a volume of the epoxy resin system. A method of treating a defect in a wellbore includes introducing the epoxy resin system into the wellbore such that epoxy resin system is proximate to a face of the defect, and maintaining the epoxy resin system at the face of the defect such that the epoxy resin system cures and a lost circulation material forms and fluidly seals the defect in the wellbore.

13 Claims, 4 Drawing Sheets

NANOSIZED DENDRIMERIC EPOXY RESIN AS A LOSS CIRCULATION MATERIAL

BACKGROUND

Various challenges are encountered during drilling and production operations of a hydrocarbon production well. For example, fluids used in drilling, completion, or servicing of a wellbore can be lost to the subterranean formation while circulating the fluids in the wellbore. In particular, the fluids may enter the subterranean formation via depleted zones, zones of relatively reduced pressure (as compared to the wellbore), "loss circulation zones" having naturally occurring fractures, weak zones having fracture gradients exceeded by the hydrostatic pressure of the drilling fluid, and so forth. The extent of fluid losses to the formation may range from minor losses (for example, less than 10 barrels/hour (bbl/hr)), also referred to as seepage loss, to severe losses (for example, greater than 100 bbl/hr), to even greater amounts, such as where fluid fails to return to the surface, also referred to as complete fluid loss. As well, the type of degree fluid loss may differ depending on the type of fluid in the wellbore. The degree of loss for oil- and synthetic oil-based muds are considered more significant at reduced amounts versus the same quantity for water-based muds due to the potential economic and environmental impacts.

Lost circulation can be encountered during any stage of operations. Lost circulation occurs when drilling fluid (or drilling mud) pumped into a well returns partially or does not return to the surface. While de minimis fluid loss is expected, excessive fluid loss is not desirable from a safety, an economical, or an environmental point of view. This is especially true when working with water-bearing formations, such as aquifers that have drinking quality fresh or mineral water, or such as brine- or formation water-bearing formations, which may contaminate hydrocarbon production, cause corrosion issues, and foul cementing jobs. Lost circulation is associated with problems with well control, borehole instability, pipe sticking, unsuccessful production tests, poor hydrocarbon production after well completion, and formation damage due to plugging of pores and pore throats by mud particles. Lost circulation problems may also contribute to non-productive time (NPT) for a drilling operation. In extreme cases, lost circulation problems may force abandonment of a well.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to an epoxy resin system composition that includes a polyhedral oligomeric silsesquioxane (POSS) epoxy resin with at least one reactive group, a curing agent, and a $CO_2$ gas-generating compound.

In another aspect, embodiments disclosed herein relate to a method of treating a defect in a wellbore. The method includes introducing an epoxy resin system into the wellbore such that epoxy resin system is proximate to a face of the defect, and maintaining the epoxy resin system at the face of the defect such that the epoxy resin system cures and a lost circulation material forms from the epoxy resin system and fluidly seals the defect in the wellbore. The epoxy resin system includes a polyhedral oligomeric silsesquioxane (POSS) epoxy resin with at least one reactive group, a curing agent, and a $CO_2$ gas-generating compound.

In yet another aspect, embodiments disclosed herein relate to a lost circulation material comprising a reaction product of an epoxy resin system. The epoxy resin system includes a polyhedral oligomeric silsesquioxane (POSS) epoxy resin with at least one reactive group, a curing agent, and a $CO_2$ gas-generating compound. The $CO_2$ gas-generating compound generates $CO_2$ during the reaction of the POSS epoxy resin with at least one reactive group and the curing agent such that a volume of the lost circulation material is greater than a volume of the epoxy resin system.

Other aspects and advantages of this disclosure will be apparent from the following description made with reference to the accompanying drawings and the appended claims.

BRIEF DESCRIPTION OF DRAWINGS

Certain embodiments of the disclosure will be described with reference to the accompanying drawings, where like reference numerals denote like elements. It should be understood, however, that the accompanying figures illustrate the various implementations described and are not meant to limit the scope of various technologies described.

In the figures, down is towards or at the bottom and up is towards or at the top of the figure. "Up" and "down" are generally oriented relative to a local vertical direction. However, as used throughout this disclosure, the terms "uphole" and "downhole" may refer to a position within a wellbore relative to the surface, with "uphole" indicating direction or position closer to the surface entry point of the wellbore and "downhole" referring to direction or position farther away from the surface entry point. One of ordinary skill in the art understands that an object or a process may be "uphole" or "downhole" of another object or process while having the same true vertical depth relative to the surface of the earth.

DETAILED DESCRIPTION

Embodiments of the present disclosure relate generally to an epoxy resin system comprising at least one poly(glycidyl silsesquioxane) (POSS) epoxy resin, a carbon dioxide ($CO_2$) gas-generating compound, a surfactant, and at least one curing agent. Upon exposing the mixture to temperatures greater than room temperature, such as those present in a wellbore or in a subterranean formation, the mixture expands, gels, and cures, into a loss circulation material (LCM). The resultant LCM does not permit significant amounts of fluids to traverse its polymer matrix and "seep" through. The resultant LCM is also resilient in that it is able to maintain significant differential pressure differences while not losing mechanical integrity.

Figure 1:
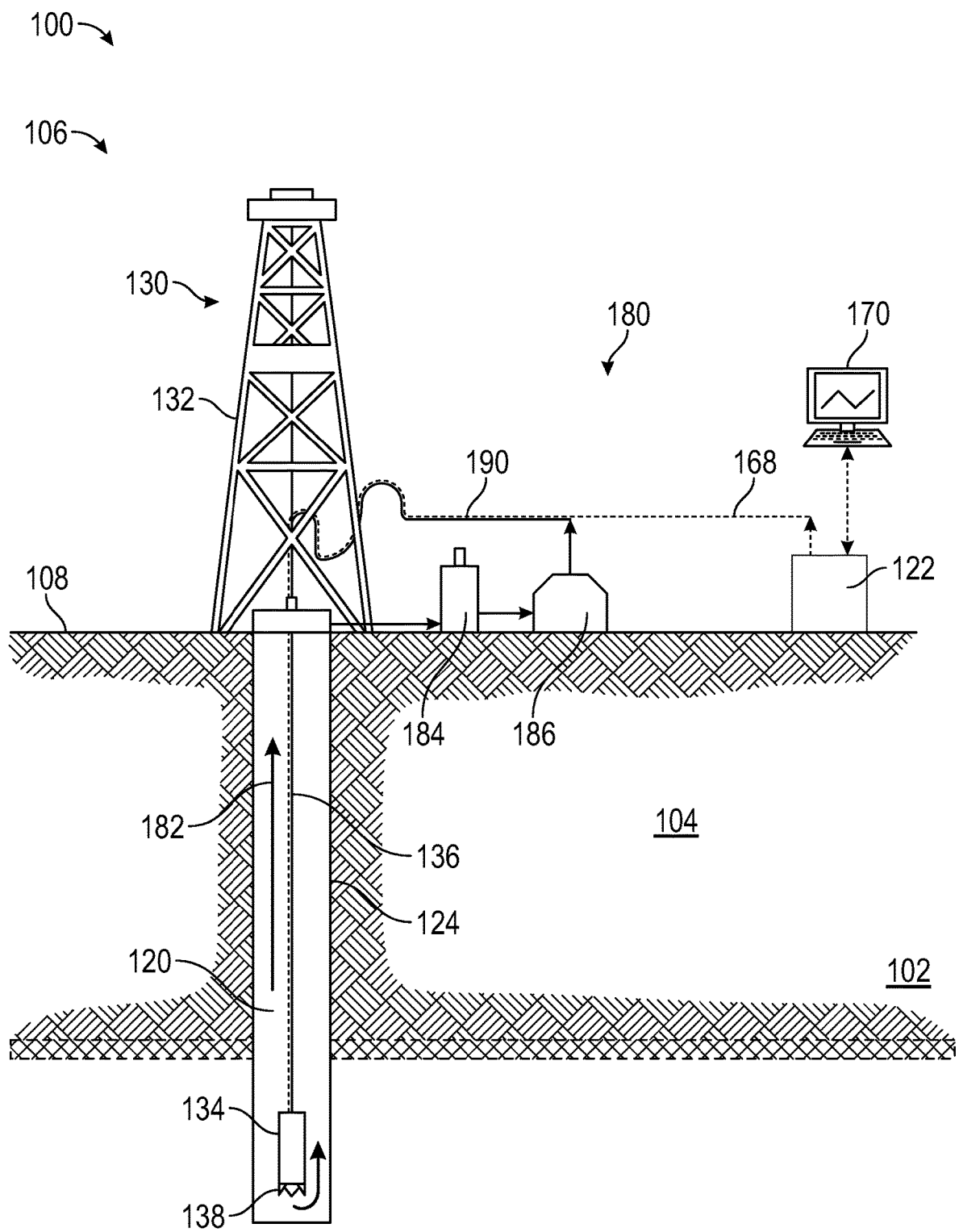
FIG. 1 is a diagram that illustrates a well environment 100 in accordance with one or more embodiments.

FIG. 1 is a diagram that illustrates a well environment 100 in accordance with one or more embodiments. The well environment 100 includes a target formation 102 for treatment located in a subsurface formation ("formation") 104 and a well system 106.

The formation 104 may include a porous or fractured rock formation that resides underground, beneath the surface 108 of the Earth. The surface 108 may be dry land or ocean bottom. The well system 106 may be for a hydrocarbon well, such as an oil well, a gas well, a gas condensate well, or a mixture of hydrocarbon-bearing fluids. The target formation 102 may be low-pressure formation (for example, a gas-depleted former hydrocarbon-bearing formation), a water-bearing formation (for example, fresh water, brine, former waterflood), or a loss circulation zone. The formation 104 and the target formation 102 may each include different layers of rock having varying characteristics, such as degrees of density, permeability, porosity, and fluid saturations. In the case of the well system 106 being operated as a production well, the well system 106 may facilitate the extraction of hydrocarbons (or "production") from a hydrocarbon-bearing formation. In the case of the well system 106 being operated as an injection well, the well system 106 may facilitate the injection of substances, such as gas or water, into a hydrocarbon-bearing formation. In the case of the well system 106 being operated as a monitoring well, the well system 106 may facilitate the monitoring of various characteristics of the formation 104 or a hydrocarbon-bearing formation, such as reservoir pressure or saturation.

The well system 106 may include a wellbore 120, a well control system (or "control system") 122 and a drilling system 130. The control system 122 may control various operations of the well system 106, such as well drilling operations, well completion operations, well production operations or well, or formation monitoring operations.

The wellbore 120 may include a bored hole that extends from the surface 108 into the formation 104, such as into and through target formation 102. Wellbore 120 is defined by wellbore wall 124. Although shown as a vertical well, wellbore 120 may take a deviated or horizontal configuration and still use similar relative terminology.

The wellbore 120 may be created, for example, by the drilling system 130 boring through the formation 104. The drilling system 130 may include a drilling rig 132 and a drill string 134. The drill string 134 may include a drill pipe 136 and a drill bit 138. In some embodiments, the drill bit 138 includes a cutting drill bit having rotating teeth that can bore through the formation 104 to create the wellbore 120.

The wellbore 120 may provide for the circulation of drilling fluids or drilling "mud" 182 during drilling operations using a mud circulation system 180. Drilling mud 182 flows downhole through the drill string 134, out the drill bit 138 (cooling the drill bit 138 at the same time from heat of friction against the face of the wellbore 120), and back uphole through the annulus formed by the drill pipe 136 and the wellbore wall 124 carrying cuttings and other debris from the bottom of the wellbore 120. Upon reaching the surface 108, the drilling mud 182 passes into mud receiving tank 184, where the cuttings are separated from the drilling mud 182. In the mud receiving tank 184, the drilling mud 182 is agitated such that it releases any dissolved gases from the drilling mud 182. The drilling mud 182 is passed to the mud storage tank 186 where it is held until it is pumped back to the drill string 134 via the mud return line 190 and then back downhole once again.

The mud circulation system 180 may provide useful information for operation and control of drilling activities. For example, with the return of less or no mud than what is introduced into the wellbore, that may indicate that wellbore fluid is entering a non-desired location, such as target formation 102, instead of performing its cooling, pressurization, and cuttings removal functions. Immediate action by an operator or a safety control system to mitigate the fluid loss is required. The well control system 122 may be is configured to determine and relay information to a control terminal 170 for viewing on an external viewer. Such maintenance or modifying operations as determined may be transmitted downhole from well control system 122 via control signal line 168.

As will be understood by one of ordinary skill in the art, FIG. 1 does not represent the totality of equipment necessary for performing drilling or other downhole operations; rather, the figure is merely illustrative for discussion purposes. Supporting equipment for the system may include additional standard components or equipment that enables and makes operable the described apparatuses, processes, methods, systems, and compositions of matter.

A "barrel" of fluid contains substantially 159 liters of fluid.

As used, the term "drilling fluid" refers to fluids, slurries, or muds used in drilling operations downhole, such as during the formation of the wellbore.

As used throughout this disclosure, the term "hydrocarbon-bearing formation" refers to a subterranean geologic region containing hydrocarbons, such as crude oil, hydrocarbon gases, or both, which may be extracted from the subterranean geologic region.

As used throughout this disclosure, the term "fluid" may include liquids, gases, or both. As used throughout the disclosure, "spacer fluid" may refer to a fluid utilized to space apart any two other materials utilized in well production.

As used throughout this disclosure, the term "cure" or "curing," when used in the context of the epoxy resin systems, may refer to the process of cross-linking the epoxy resin, which is in a liquid form initially, with a curing agent to form a semi-solid or solid cured epoxy.

As used throughout this disclosure, the term "cure time," when used in the context of the epoxy resin system, may refer to a time duration between a first time at which a curing agent is added to the epoxy resins and a second time at which the epoxy resin system has cured to form at least a semi-solid epoxy.

As used in this disclosure, the term "semi-solid" may refer to a state of the epoxy resin system that is between a liquid and a solid and in which the epoxy resin system exhibit greater elasticity and flexibility compared to compositions cured all the way to a rigid solid. In the semi-solid state, the cured epoxy resin system may be easily deformed but may return to shape upon releasing the deforming force.

Methods disclosed include introduction of an epoxy resin system to a wellbore. The application of the epoxy resin system upon curing can provide effective zonal isolation to loss circulation zones, water-bearing formations, and portions of hydrocarbon-bearing formation with excessive water production.

Epoxy Resin System Composition

In one or more embodiments, the epoxy resin system may include at least one POSS epoxy resin, a carbon dioxide ($CO_2$) gas-generating compound, a surfactant, and at least one curing agent. As used in this disclosure, the term "epoxy resin system" may refer to the constituents that react to form the cured epoxy and may include, but are not limited to, the epoxy resins and curing agents. The epoxy resin system may exclude components and additives that do not participate in the polymerization reaction of the epoxy resin system, such as by consisting essentially of or constating of the aforementioned components.

Figure 2:
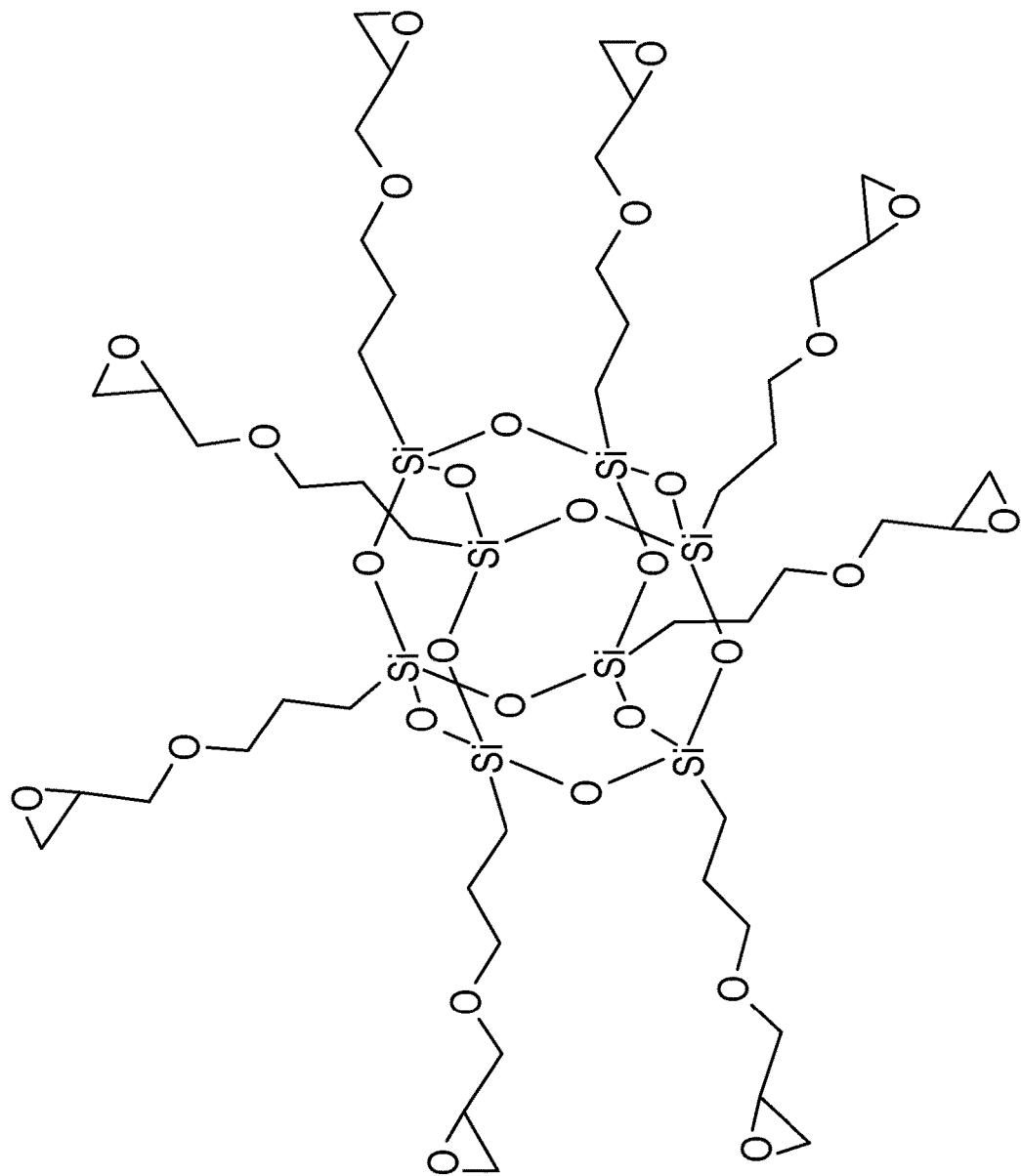
FIG. 2 shows a schematic of poly(glycidyl silsesquioxane), CAS NO. 68611-45-0.

The epoxy resin system includes at least one POSS epoxy resin. The abbreviation "POSS" stands for polyhedral oligomeric silsesquioxane. FIG. 2 shows a schematic of an example POSS, poly(glycidyl silsesquioxane), CAS NO. 68611-45-0 (item 200). The epoxy resin system includes a POSS epoxy resin that includes at least one curable group. In some embodiments, the POSS epoxy resin includes eight curable groups. In embodiments, a POSS epoxy resin includes a curable group that is reactive with a curing agent.

The POSS epoxy resin can include one or more different compositions of POSS. POSS is a polyorganosiloxane with a polyhedral chemical structure. The POSS can have the average unit formula $[R^1SiO_{1.5}]$, where at least one $R^1SiO_{1.5}$ unit in the POSS includes a curable group. The repeating unit of the POSS can have the structure:

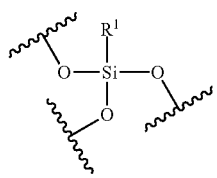

(Formula I)

where each silicon-bonded oxygen is bonded to another silicon atom, a hydrogen atom (for example, silanol), or to an independently selected $R^1$ as will be defined. The POSS can have a total number of $[R^1SiO_{1.5}]$ units selected from the group consisting of 6, 7, 8, 9, 10, 11, and 12 and thus a corresponding number of curable groups. In embodiments, the POSS epoxy resin has 12 $[R^1SiO_{1.5}]$ units. The POSS can be any suitable POSS. The POSS can be a partially or fully caged. In one or more embodiments, the POSS epoxy resin is fullycaged, that is, each corner of the POSS polyhedron can be occupied by a silicon atom, and each edge of the polyhedron can be formed by an Si—O—Si unit. The POSS can include at least three faces, with each face having a different plane, and with each face being defined as four interconnected $R_1SiO_{1.5}$ units, having the structure:

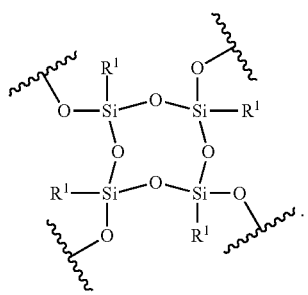

(Formula II)

In some embodiments, the POSS epoxy resin has six faces like that of a cube, and is therefore "fully caged".

In one or more embodiments, the POSS can have a structure:

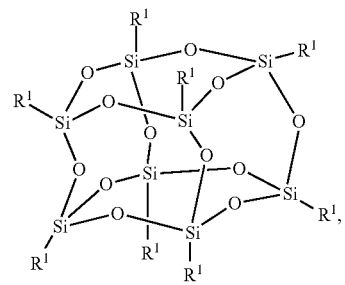

(Formula III)

where the variable $R^1$ in each of Formula I-III can be independently selected from the group consisting of ($C_1$-$C_{30}$)hydrocarbyl, ($C_1$-$C_{30}$)hydrocarbylene-CG, and -CG, where each ($C_1$-$C_{30}$)hydrocarbyl and ($C_1$-$C_{30}$)hydrocarbylene is independently substituted or unsubstituted and is interrupted or terminated by 0, 1, 2, or 3 substituted or unsubstituted S, O, P, or N atoms (where an unsubstituted atom designates, for example, the S, O, P, or N atom having no substituents or having —H thereon), and where "CG" is at least one curable group.

At least one $R^1$ in the POSS includes a curable group, such as an epoxide group. In some embodiments, the $R^1$ groups for the POSS epoxy resin are all the same. In some such embodiments, all the $R^1$ groups for the POSS epoxy resin are all glycidyl groups.

According to one or more embodiments, the epoxy resin system optionally includes at least one additional epoxy resin that is not the POSS epoxy resin. The epoxy resin system may include additional epoxy resins, including, but not limited to, bisphenol-A-based epoxy resins, bisphenol-F-based epoxy resins, aliphatic epoxy resins, aromatic epoxy resins, Novalac resins, and combinations thereof. The epoxy resin system may include 1,6-hexanediol diclycidyl ether, alkyl glycidyl ethers having from 12 to 14 carbon atoms, butyl glycidyl ether, 2,3-epoxypropyl o-tolyl ether, cyclohexanedimethanol diclycidyl ether, bisphenol-A-epichlorohydrin epoxy resin, or combinations of these. In one or more embodiments, the epoxy resin system may include bisphenol-A-epichlorohydrin epoxy resin and 2,3-epoxypropyl-o-tolyl ether.

Aliphatic and aromatic epoxy resins may include glycidyl ethers and diglycidyl ethers. Glycidyl ethers may include alkyl glycidyl ethers, aromatic glycidyl ethers, or both. Glycidyl ethers may have chemical formula (IV):

$$R^2-O-CH_2-(C_2H_3O) \qquad (IV),$$

where $R^2$ may be a linear, branched, cyclic, or aromatic hydrocarbyl having from 4 to 24 carbon atoms, such as from 4 to 20, from 4 to 16, from 4 to 12, from 4 to 8, from 6 to 24, from 6 to 20, from 6 to 16, from 6 to 12, or from 12 to 14 carbon atoms. In one or more embodiments, $R^2$ may be a branched, linear, or cyclic alkyl. In some embodiments, $R^2$ may include one or more substituted or unsubstituted aromatic rings. In some embodiments, the epoxy resin may include $C_{12}$-$C_{14}$ alkyl glycidyl ethers, butyl glycidyl ether, 2,3-epoxypropyl-o-tolyl ether, or combinations of these.

Diglycidyl ethers may have chemical formula (V):

$$(OC_2H_3)-CH_2-O-R^3-O-CH_2-(C_2H_3O) \qquad (V)$$

where $R^3$ may be a linear, branched, cyclic, or aromatic hydrocarbyl having from 4 to 24 carbon atoms, such as from 4 to 20, from 4 to 16, from 4 to 12, from 4 to 8, from 6 to 24, from 6 to 20, from 6 to 16, from 6 to 12, or from 12 to 14 carbon atoms. In one or more embodiments, $R^3$ may include one or more substituted or unsubstituted aromatic rings. In one or more embodiments, $R^3$ may be an alkyl group or cycloaklyl group. For example, the epoxy resin may include 1,6-hexanediol diglycidyl ether, which has chemical formula (VI):

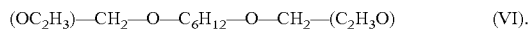

$$(OC_2H_3)-CH_2-O-C_6H_{12}-O-CH_2-(C_2H_3O) \quad (VI).$$

In some embodiments, the epoxy resin may include cyclohexanedimethanol digylcidyl ether, which has chemical formula (VII):

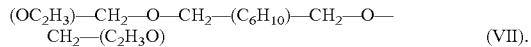

$$(OC_2H_3)-CH_2-O-CH_2-(C_6H_{10})-CH_2-O- \\ CH_2-(C_2H_3O) \quad (VII).$$

The additional epoxy resin may include unmodified bisphenol-A-(epichlorohydrin) epoxy resin, which may have a epoxy equivalent weight (EEW) for about 160 g/eq (grams per equivalent of epoxy) and exhibit a dynamic viscosity (DV) of from about 2 mPa*s (millipascal-seconds) to about 10 mPa*s. As used here, epoxy equivalent weight is the weight of the resin in grams per 1 gram-equivalent of epoxy. The additional epoxy resin may include 2,3-epoxypropyl-o-tolyl ether, which may have an epoxy equivalent weight of from 170 g/eq to 190 g/eq and exhibit a dynamic viscosity of from 7 mPa*s to 10 mPa*s. The additional epoxy resin may include alkyl glycidyl ethers having from 12 to 14 carbon atoms, which may have an epoxy equivalent weight of from 270 g/eq to 305 g/eq and may exhibit a dynamic viscosity of from 5 mPa*s to 12 mPa*s. The additional epoxy resin may include 1,6-hexanediol diclycidyl ether, which may have an epoxy equivalent weight of from 150 g/eq to 170 g/eq and may exhibit a dynamic viscosity of from 20 mPa*s to 30 mPa*s. The additional epoxy resin may include cyclohexanedimethanol diglycidyl ether, which may have an epoxy equivalent weight of from 125 g/eq to 145 g/eq and may exhibit a dynamic viscosity of from 50 mPa*s to 70 mPa*s. The additional epoxy resin may include butyl glycidyl ether, which may have an epoxy equivalent weight of from 120 g/eq to 140 g/eq and may exhibit a dynamic viscosity of from 400 mPa*s to 500 mPa*s. In one or more embodiments, there may be a combination of epoxy resins.

The epoxy resin system may include an amount of the epoxy resin sufficient to form a cured epoxy composition. For example, the epoxy resin system may include from about 50 wt. % (weight percent) to about 98 wt. % of epoxy resin based on the total weight of the epoxy resin system before curing. The epoxy resin may have a lower limit of one of 50, 55, 60, 65, and 70 wt. %, and an upper limit of one of 75, 80, 85, 90, 95, and 98 wt. %, of the epoxy resin system, where any lower limit may be paired with any upper limit. The weight percentages for the epoxy resin, the carbon dioxide ($CO_2$) gas-generating compound, the surfactant, and the curing agent, are provided for the epoxy resin system formulation at the time of preparing the epoxy resin system prior to any cross-linking or curing, which may change the chemical make-up of one or more of these constituents.

As previously discussed, the epoxy resin system includes a $CO_2$ gas-generating compound to generate gas in the composition such that it expands during the curing process. The $CO_2$ gas-generating compound is a compound that reacts with another component in the epoxy resin system to form $CO_2$ gas. Examples of $CO_2$ gas-generating compounds include, but are not limited to, carbonic acid, carbonates of alkali metals, bicarbonates of alkali metals, carbonates of alkaline earth metals, and bicarbonates of alkaline earth metals. In one or more embodiments, the $CO_2$ gas-generating compound is selected from the group consisting of baking soda (sodium bicarbonate), baking powder, and combinations thereof.

The epoxy resin system may include a suitable amount of the $CO_2$ gas-generating compound for producing an expanded composition. In one or more embodiments, the epoxy resin system may include in a range from about 0.1 wt. % to 10.0 wt. % of the $CO_2$ gas-generating compound. The $CO_2$ gas-generating compound in the epoxy resin system may have a lower limit of one of 0.1, 0.2, 0.5, 1.0, 2.0, 2.5, and 3.0 wt. %, and an upper limit of one of 4.0, 5.0, 6.0, 7.0, 8.0, 9.0 and 10.0 wt. %, where any lower limit may be paired with any upper limit.

As previously discussed, the epoxy resin system includes a surfactant. Surfactants may facilitate the generation of a stable foam in the epoxy resin system. The surfactant may include non-ionic, cationic, anionic, zwitterionic surfactants, and combinations thereof.

Examples of types of anionic surfactants include, but are not limited to, sodium and potassium salts of straight-chain fatty acids, fatty alcohol carboxylates, sulfonic acid salts, sulfuric acid ester salts, phosphoric acid esters, and polyphosphoric acid esters. Examples of types of cationic surfactants include, but are not limited to, long-chain amines, salts of long chain amines, acylated diamines, acylated polyamines, salts of acylated diamines, salts of acylated polyamines, quaternary ammonium salts, polyoxyethylenated (POE) long-chain amines, quaternized POE long-chain amines, and amine oxides. Examples of types of non-ionic surfactants include, but are not limited to, POE alkylphenols, alkylphenol ethoxylates, POE straight-chain alcohols, alcohol ethoxylates, POE polyoxypropylene glycols, POE mercaptans, propylene glycol, sorbitol, POE sorbitol esters, alkanolamides, POE silicones, and alkylpolyglycosides. Examples of types of zwitterionic surfactants include, but are not limited to, N-alkylaminopropionic acids, imidazoline carboxylates, N-alkylbetaines, amidoamines, amidobetaines, sulfobetaines, and sultaines.

The epoxy resin system may include a suitable amount of the surfactant for producing a stable foam. In one or more embodiments, the epoxy resin system may include in a range of from about 0.1 wt. % to 5.0 wt. % of the surfactant. The surfactant in the epoxy resin system may have a lower limit of one of 0.1, 0.2, 0.5, 1.0, 2.0, and 2.5 wt. %, and an upper limit of one of 3.0, 3.5, 4.0, 4.5 and 5.0 wt. %, where any lower limit may be paired with any upper limit. Due to the presence of the $CO_2$ gas-generating compound and the surfactant, the epoxy resin system may expand as the components of the epoxy resin system are combined. In one or more embodiments, the epoxy resin system may expand in a range of from about 5 to 50 vol. % (volume percent) based on the original volume of the components.

As previously discussed in this disclosure, the epoxy resin system includes a curing agent to cure the epoxy resin present in the epoxy resin system. The curing agent may include at least one amine group. Curing agents with amine functional groups may include, but are not limited to, at least one of an amine, polyamine, amine adduct, polyamine adduct, alkanolamine, phenalkamines, or a combinations of these. Examples of amine or polyamine curing agents may include, but are not limited to, aliphatic amines; cycloaliphatic amines; modified cycloaliphatic amines, such as cycloaliphatic amines modified by polyacrylic acid; aliphatic polyamines; cycloaliphatic polyamines; modified polyamines, such as polyamines modified by polyacrylic acid; or amine adducts, such as cycloaliphatic amine adducts and polyamine adducts.

The term "amine" as used refers to primary, secondary, and tertiary amines having, for example, the formula N(group)$_3$, where each 'group' can independently be H or non-H, such as alkyl and aryl. Amines include, but are not limited to, R—NH$_2$, for example, alkylamines, arylamines, alkylarylamines; R$_2$NH, where each R is independently selected, such as dialkylamines, diarylamines, arylalkylamines, and heterocyclylamines; and R$_3$N, where each R is independently selected, such as trialkylamines, dialkylarylamines, alkyldiarylamines, and triarylamines. The term "amine" also includes ammonium ions as used.

In one or more embodiments, the curing agent may include at least one of trimethyl hexamethylene diamine (TMD), diethylenetriamine (DETA), triethylenetetramine (TETA), meta-xylenediamine (MXDA), aminoethylpiperazine (AEP), tetraethylenepentamine (TEPA), polyetheramine, isophoronediamine (IPDA), diethyltoluenediamine (DETDA), polyoxypropylene diamine, or a combinations thereof. In one or more embodiments, the curing agent may include at least one of DETA, DETDA, polyoxypropylene diamine, or combinations thereof. In one or more embodiments, the curing agent comprises DETA.

The amine curing agent may have an amine hydrogen equivalent weight (AHEW) that enables the amine curing agent to fully cure the epoxy resin system. The AHEW of an amine curing agent refers to the grams of the amine curing agent containing 1 equivalent of amine. The AHEW of an amine curing agent may be calculated by dividing the molecular weight of the amine curing agent in grams per mole by the number of active hydrogens per molecule. In some embodiments, the curing agent may be an amine curing agent having an AHEW of from about 20 grams (g) to about 120 g, from 20 g to 115 g, from 20 g to 110 g, from 20 g to 100 g, from 40 g to 120 g, from 40 g to 115 g, from 40 g to 110 g, from 40 g to 110 g, from 60 g to 120 g, from 60 g to 115 g, or from 60 g to 110 g as determined according to the methods previously described in this disclosure.

The epoxy resin system may include an amount of curing agent sufficient to cure the epoxy resins in the epoxy resin system to a semi-solid or solid state. The epoxy resin system may include in a range of from about 0.5 to 10 wt. % of the curing agent based on the total weight of the epoxy resin system before curing. The curing agent in the epoxy resin system may have a lower limit of one of 0.5, 1.0, 1.5, 2.0, 2.5, 3.0, 3.5, and 4.0 wt. %, and an upper limit of one of 5.0, 6.0, 7.0, 8.0, 9.0 and 10.0 wt. %, where any lower limit may be paired with any upper limit.

In some embodiments, a diluent is included to assist in solvating the reactants as well as slow down the reaction process. Examples of useful diluents may include, but are not limited to, fractions of distilled hydrocarbons, such as mineral oils, kerosene, and diesel. Other examples include low viscous resins, such as Razeen® D 7106 from Jana Chemicals (Jubail Industrial City, Kingdom of Saudi Arabia), which is a reactive diluent for epoxy resin systems.

Components of epoxy resin systems in accordance with the present disclosure may be reacted to form a reaction product that is a loss circulation material. The reaction product of the epoxy resin system may be formed by reacting at least one reactive group of the POSS epoxy resin with a curing agent. Due to the CO$_2$ gas generated by the CO$_2$ gas-generating compound, the volume of the reaction product may be greater than the volume of the mixed components of the epoxy resin system. As such, an expanded reaction product useful as a loss circulation material may be formed.

Method of Using the Epoxy Resin System

Figure 3:
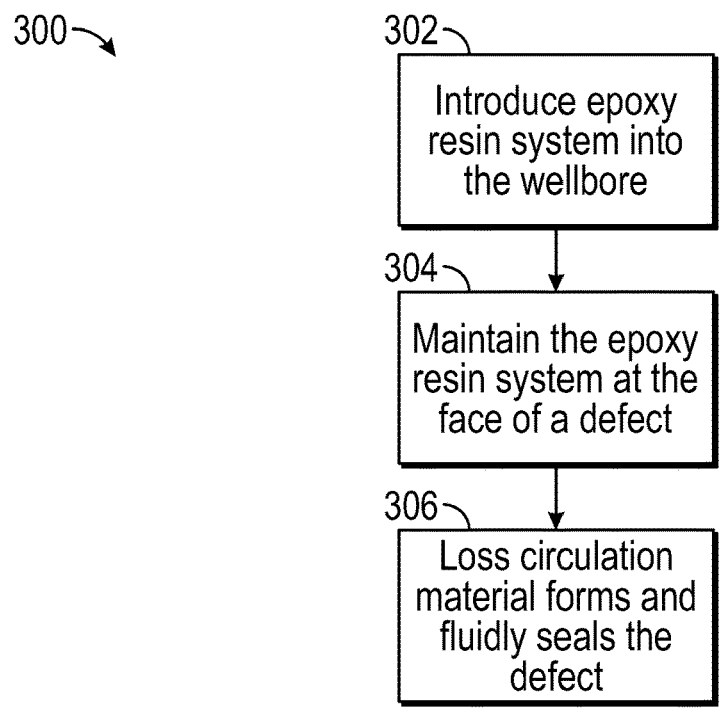
FIG. 3 is a block flow diagram of a method in accordance with one or more embodiments.

In one aspect, embodiments disclosed relate to a method of using the previously disclosed epoxy resin system as a loss circulation material. A method 300 in accordance with one or more embodiments of the present disclosure is shown in FIG. 3. In one or more embodiments, the epoxy resin system is introduced into the wellbore 302. Introducing embodiment epoxy resin systems into a wellbore may include introducing the material into or proximate to the face of a lost circulation zone. The face of the lost circulation zone is associated with the formation causing lost circulation and is in fluid communication with the wellbore.

Prior to introducing the embodiment epoxy resin system into a wellbore, components of the epoxy resin system may be mixed, for example in a tank or a batch mixer. In such embodiments, all components except for the curing agent are initially mixed. The curing agent may be added and then the mixture is immediately introduced into the wellbore, for example, by pumping the mixture downhole. In one or more embodiments, components of the epoxy resin system, except for the curing agent, may be premixed into a drilling fluid creating an altered drilling fluid. In such embodiments, the curing agent may be introduced proximate to or directly into a lost circulation zone. For example, coiled tubing may be used to introduce the curing agent directly into the face of the lost circulation zone to initiate curing of the epoxy resin system in the lost circulation zone.

Referring to FIG. 1, the loss circulation material system may be blended into the drilling mud 182 in the mud storage tank 186 and pumped downhole to mitigate the effects of the target formation 102. The drilling mud 182 containing the epoxy resin system flows downhole through the drill string 134, out the drill bit 138, and back uphole through the annulus formed by the drill pipe 136 and the wellbore wall 124. Upon reaching the target formation 102, at least a portion of the curing agent is introduced into the target formation 102, where the reaction to form the loss circulation material is completed.

Depending on how introduced, the resultant loss circulation material begins to form as the components of the epoxy resin system are intimately intermixed. The reaction to form the loss circulation material may be initiated wherever the components of the epoxy resin system are first introduced to one another at suitable reaction conditions, for example, before introduction into the wellbore, in a fluid conduit, such as a wellbore annulus or drill pipe, at the face of the loss circulation zone, or within the target formation (the low-pressure formation, the loss circulation zone, the water-bearing formation). Regardless of where the reaction is initiated, the cured loss circulation material fully cures in the target formation to mitigate the intrusion from or loss into the target formation.

After components of the epoxy resin system have been introduced into the wellbore 302, the wellbore conditions are maintained 304 such that the epoxy resin system cures into the loss circulation material. After introducing the epoxy resin system into the wellbore, maintaining wellbore conditions such that the epoxy resin system converts into a cured loss circulation material may or may not entail routine or non-routine actions, such as the operation of fluid pumps, the running or retrieval of piping, or the circulation of drilling or wellbore fluids in the wellbore. For example, if the loss circulation zone or formation is low pressure, the wellbore may have to be maintained at a pressure less than the formation or loss zone or risk creating flow conditions that may negatively impact the positioning and adhesion of the epoxy resin system while it is curing. As another example, if the formation is a high-pressure water formation, additional weighting of the wellbore fluid or even zonal isolation of that portion of the wellbore may occur before the introduction of the epoxy resin system to plug the formation face. No additional chemical or physical interaction with the curing epoxy resin system should be required. In some embodiments, the wellbore conditions are maintained for a period in a range of from about 0.5 hour to about 24 hours, during which time the loss circulation material forms.

The various epoxy resins in the epoxy resin system may be in liquid form initially. Upon combining the various epoxy resins with the surfactants, the composition expands in volume due to the presence of the $CO_2$ gas-generating compound. As the composition expands in volume, the various epoxy resins react with the curing agents to convert into a resultant semi-solid or solid epoxy resin while maintaining the expanded volume. Transition of the epoxy resin system from a liquid to a solid involves formation of covalent bonds via cross-linking reactions. Thus, during the curing process, the epoxy resin system may begin to form into a three-dimensional thermoset polymer network. During the transition from fluid to solid through cross-linking, the increase of viscosity in the epoxy resin system may enable the epoxy resin system to partially and then continuously resist fluid flow driven by differential pressure. Fluid flow for low-pressure zones, loss circulation zones, and some water-bearing formations versus the wellbore tends to be from the wellbore into the formation. At the point in the curing process, a pressure differential may form across the curing epoxy resin system as the cured material begins to materially block fluid flow. With the mitigation of fluid flow into or out of the loss circulation zone or water-bearing formation, the remediation is technically complete. The loss circulation zone or water-bearing formation no longer has a pathway to receive fluids from or convey fluids to the surface through the wellbore.

As the components of the epoxy resin system continue to react, an impermeable barrier forms at the face of or inside the formation comprising the loss circulation zone or the water-bearing formation, fluidly sealing the defect in the formation 306. As a cured product, fluids (liquids, gases) may not be conducted through the point of application of the epoxy resin system. A significant differential pressure may exist between the two sides of the cured product.

The epoxy resin system may have a cure time that enables the epoxy resin system to be introduced to the loss circulation zone, the water-bearing formation, or the hydrocarbon-bearing formation, before the epoxy resin system becomes unpumpable due to increased viscosity from crosslinking. In some embodiments, the cure time may be in a range of from about 0.5 to 12 hours.

The embodiment loss circulation material is both immobile and impenetrable in the formation or zone being treated, even under differential pressure conditions. The embodiment epoxy resin system may be used for closing off the fluid flow pathway into a loss circulation zone, sealing the face of a water-bearing formation, or shutting a portion of a hydrocarbon-beating formation where water fingering or other high-water content production fluid results in water entering the wellbore. In embodiments of the epoxy resin system, the composition may be adapted to different downhole conditions by changing the total or relative concentrations of the epoxy resin, the surfactant and the $CO_2$ gas-generating compound or the curing agents to modify the specific gravity, viscosity, mechanical properties, curing time, volume expansion, or other properties, of the epoxy resin system. The cured loss circulation material may be configured to withstand a wide range of temperatures and pressures without failing or deteriorating. Failing or deterioration of the LCM would allow liquids or gases to penetrate into or through the LCM into or out of the loss circulation zone or the water-bearing formation and into the wellbore.

As a non-limiting example, the loss circulation material, once cured, may be configured to withstand temperatures in a range of from about 20 degrees Celsius (° C.) to about 205° C. The cured LCM may also be configured to withstand temperature cycling within a temperature range of from about 20° C. to about 205° C. The cured loss circulation material may be configured to withstand differential pressure conditions of up to about 20,000 psid (137.9 megapascals (MPa)) (1 psi equals 0.00689476 MPa). For example, in some embodiments, the cured loss circulation material may be configured to withstand a pressure differential of from about 14 psid (96 kPa or 0.096 MPa differential) to about 20,000 psid (137.9 MPa differential) without failing or deteriorating.

EXAMPLES

The following examples illustrate one or more features of the present disclosure. It should be understood that these examples are not intended to limit the scope of the disclosure or the appended claims in any manner.

Example 1

Figure 4A:
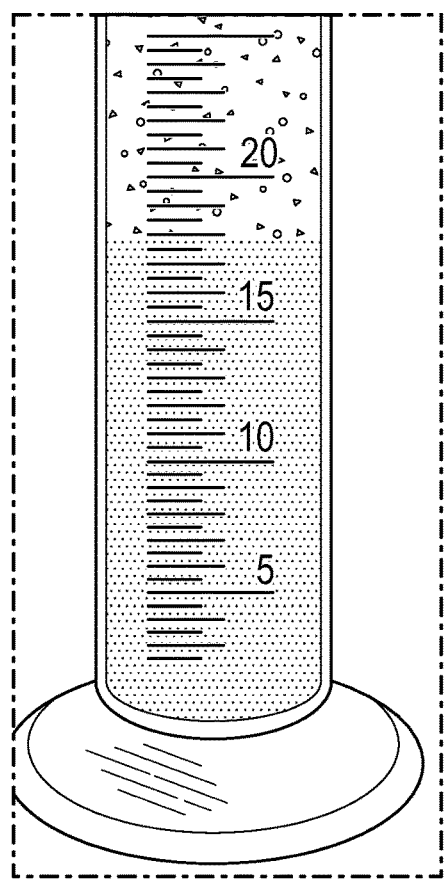
FIG. 4A is a depiction of a cured resin in accordance with one or more embodiments.

In the first experiment, 15 grams (g) of EP0409 is introduced into a sample tube. EP0409 is a glycidyl POSS cage mixture from Hybrid Plastics (Hattiesburg, Miss.), the formula of such structure shown in FIG. 2. A curing agent in the form of 2.25 g of RAZEENCURE® 931 is added to the sample tube and the components are mixed for 2 minutes using a glass stir rod. RAZEENCURE® 931 is comprised of diethylenetriamine (DETA) and is available from Jana Chemicals (Jubail Industrial City, Kingdom of Saudi Arabia). After addition of the curing agent to the epoxy resin, the sample was allowed to cure at 180° C. for 2 hours. The sample tube after curing is shown in FIG. 4A. No volume expansion was observed.

Example 2

Figure 4B:
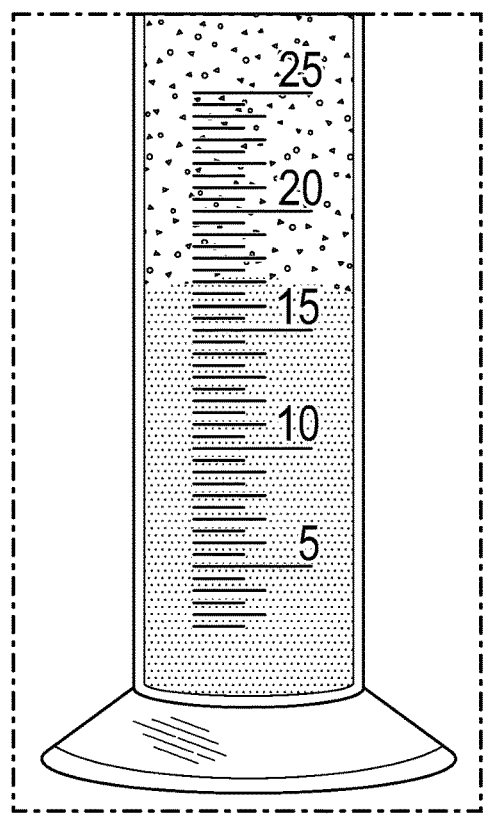
FIG. 4B is a depiction of an uncured resin in accordance with one or more embodiments.
Figure 4C:
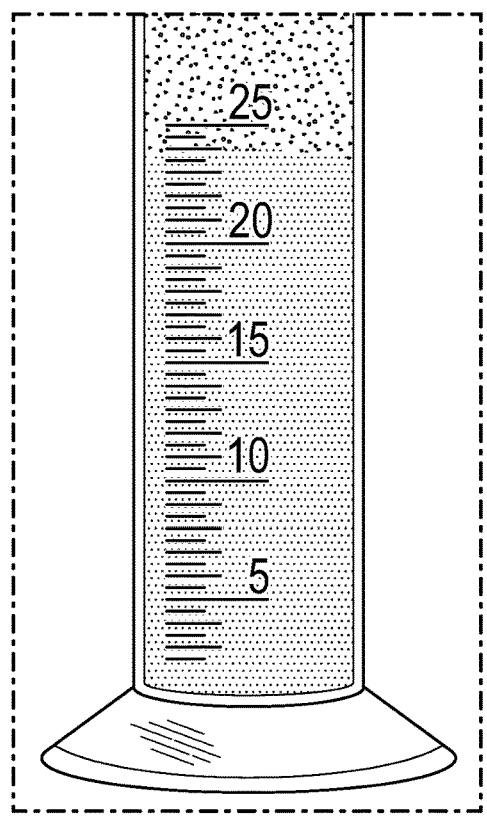
FIG. 4C is a depiction of a cured resin in accordance with one or more embodiments.

For the second experiment, a mixture of 15 g of EP0409 and 0.5 g of PETROSTEP SB and 1 g of sodium bicarbonate are introduced into a sample tube and mixed for 2 minutes using a glass stir rod. PETROSTEP SB is an aqueous solution of cocoamidopropyl hydroxysultaine and is available from Stepan Company (Northfield Ill., USA). Sodium bicarbonate (99.7% purity) is available from Signa Aldrich. A curing agent in the form of 2.25 g of RAZEENCURE® 931 is added to the sample tube and the components are mixed for 2 minutes using a glass stir rod. The sample tube immediately after mixing is shown in FIG. 4B. The sample volume is about 17 mL (milliliters). After addition of the curing agent to the epoxy resin, the sample was allowed to cure at 180° C. for 2 hours. The sample tube after curing is shown in FIG. 4C. The volume of the sample is about 25 mL (milliliters), indicating expansion of the mixture.

Unless defined otherwise, all technical and scientific terms used have the same meaning as commonly understood by one of ordinary skill in the art to which these systems, apparatuses, methods, processes and compositions belong.

It is noted that one or more of the following claims utilize the term "where" or "in which" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter. The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

As used in the Specification and appended Claims, the singular forms "a", "an", and "the" include plural references unless the context clearly indicates the contrary. The verb "comprises" and its conjugated forms should be interpreted as referring to elements, components or steps in a non-exclusive manner. The referenced elements, components or steps may be present, utilized or combined with other elements, components or steps not expressly referenced.

As used here and in the appended claims, the words "comprise," "has," and "include" and all grammatical variations thereof are each intended to have an open, non-limiting meaning that does not exclude additional elements or steps.

"Optionally" means that the subsequently described event or circumstances may or may not occur. The description includes instances where the event or circumstance occurs and instances where it does not occur.

When the word "approximately" or "about" are used, this term may mean that there can be a variance in value of up to ±10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

Although only a few example embodiments have been previously described in detail, those skilled in the art will readily appreciate that many modifications are possible in the example embodiments without materially departing from the envisioned scope. Accordingly, all such modifications are intended to be included within the scope of this disclosure as defined in the following claims. In the claims, means-plus-function clauses are intended to cover the structures described as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims, except for those in which the claim expressly uses the words 'means for' together with an associated function.

What is claimed is:

1. A method of treating a defect in a wellbore, comprising:
    introducing an epoxy resin system into the wellbore such that the epoxy resin system is proximate to a face of the defect; and
    maintaining the epoxy resin system at the face of the defect such that the epoxy resin system cures and a lost circulation material forms from the epoxy resin system and fluidly seals the defect in the wellbore;
    wherein the epoxy resin system comprises:
        a polyhedral oligomeric silsesquioxane (POSS) epoxy resin with at least one reactive group;
        a curing agent; and
        a $CO_2$ gas-generating compound.

2. The method of claim 1, wherein the introducing step comprises:
    introducing the POSS epoxy resin with at least one reactive group and the $CO_2$ gas-generating compound into a drilling fluid; and
    introducing the curing agent proximate to the face of the defect via coiled tubing.

3. The method of claim 1, wherein the epoxy resin system is maintained for from about 0.5 hour to about 24 hours.

4. The method of claim 1, wherein the lost circulation material is configured to withstand temperatures in a range of from about 20° C. to about 205° C.

5. The method of claim 1, wherein the lost circulation material is configured to withstand differential pressure conditions of up to about 20,000 psid.

6. A lost circulation material comprising a reaction product of an epoxy resin system, the epoxy resin system comprising:
    a polyhedral oligomeric silsesquioxane (POSS) epoxy resin with at least one reactive group;
    a curing agent; and
    a $CO_2$ gas-generating compound;
    wherein the $CO_2$ gas-generating compound generates $CO_2$ during the reaction of the POSS epoxy resin with at least one reactive group and the curing agent such that a volume of the lost circulation material is greater than a volume of the epoxy resin system.

7. The lost circulation material of claim 6, wherein the lost circulation material is configured to withstand temperatures in a range of from about 20 degrees Celsius (° C.) to about 205° C.

8. The lost circulation material of claim 6, wherein the lost circulation material is configured to withstand differential pressure conditions of up to about 20,000 psid.

9. The lost circulation material of claim 6, wherein the POSS epoxy resin with at least one reactive group is poly(glycidyl silsesquioxane).

10. The lost circulation material of claim 6, comprising from about 50 wt. % to about 98 wt. % of the POSS epoxy resin.

11. The lost circulation material of claim 6, comprising from about 0.1 wt. % to 10.0 wt. % of the $CO_2$ gas-generating compound.

12. The lost circulation material of claim 6, wherein the curing agent is trimethyl hexamethylene diamine (TMD), diethylenetriamine (DETA), triethylenetetramine (TETA), meta-xylenediamine (MXDA), aminoethylpiperazine (AEP), tetraethylenepentamine (TEPA), polyetheramine, isophoronediamine (IPDA), diethyltoluenediamine (DETDA), polyoxypropylene diamine, or a combinations thereof.

13. The lost circulation material of claim 6, comprising from about 0.5 to 10 wt. % of the curing agent.

\* \* \* \* \*